Aug. 14, 1962 L. P. GARVEY 3,048,873
WINDSHIELD WIPER BLADE
Filed Sept. 24, 1956

INVENTOR.
Louis P. Garvey
BY
D. C. Staley
His Attorney

3,048,873
WINDSHIELD WIPER BLADE
Louis P. Garvey, Detroit, Mich., assignor to General Motors Corporation, Detroit, Mich., a corporation of Delaware
Filed Sept. 24, 1956, Ser. No. 611,434
9 Claims. (Cl. 15—250.42)

This invention pertains to the art of windshield cleaning and, particularly to an improved blade construction designed for wiping curved surfaces.

It has long been recognized that to adequately clean a curved windshield surface, the wiping element must be maintained substantially normal to the curved surface. This necessary arrangement, or relationship, is very difficult to obtain on a windshield surface having a compound curvature, such as the present day wrap-around windshields. The present invention relates to an improved wiper blade assembly or more particularly an improved pressure distributed linkage for a wiper blade assembly, whereby the rubber wiping element will be maintained substantially normal to the glass throughout the variable slopes or curvatures in the glass surface. Accordingly, among my objects are the provision of an improved blade assembly particularly designed for cleaning curved surfaces; and the further provision of a pressure distributing linkage assembly for a flexible wiping blade wherein the pivot joints between the linkage members are located at an oblique angle relative to the longitudinal blade axis. More particularly, the axis of the hinge connections between the pressure distributing linkage members is located at an angle inclined to the axis of the arm and extending downwardly in the direction of the curved surface of the windshield to be cleaned so as to maintain the wiping element substantially normal to the curved surface it transverses.

The aforementioned and other objects are accomplished in the present invention by arranging the hinge axis between the members of the blade linkage at an oblique angle relative to the longitudinal blade axis thereby permitting the links to revolve about these oblique axes to maintain the rubber wiping element substantially normal to the glass. Specifically, the wiper blade assembly is such that the pressure distributing linkage members rotate about the oblique axes during the outboard portion of the wiping stroke. The wiper blade comprises an elongated elastomeric wiping element having a wiping lip and a retention portion. The retention portion of the elastomeric wiping element is received and held by a flexible backing strip. The backing strip is freely flexible in a plane normal to the surface to be wiped, but substantially inflexible in a plane parallel thereto. The aforegoing blade construction is conventional.

In a specifically disclosed embodiment, the pressure distributing linkage comprises a primary yoke or holder, the intermediate portion of which is connected to an outer arm section through a conventional clip or blade to arm connection means. Each end of the primary yoke is pivotally connected to the intermediate portion of a secondary yoke. The ends of the secondary yokes are movably connected to the backing strip at longitudinally spaced points. The wiper arm applies pressure to the primary yoke, and this pressure is distributed to the blade throughout its length so that the blade will conform to the surface to be wiped.

In this invention, the pivot connections between the outer ends of the primary yokes and the secondary yokes are located at an angle oblique to the longitudinal blade axis. More particularly, the hinge joints comprise pins having an axis located at an angle of substantially 45°, rather than the conventional 90°, to the longitudinal blade axis. With a wiper blade of this construction, when the wiper arm moves throughout its oscillatory stroke over the surface of a wrap-around windshield, during the outboard portion of the stroke where the glass is severely curved, the secondary yokes pivot about their oblique hinge axes connections with the primary yoke so as to maintain the wiper blades substantially normal to the glass. This arrangement compensates for the glass twist. In addition, the oblique angle connection between the primary and the secondary yokes provides a variable rubber element layover, i.e., the wiper blade is maintained substantially normal to all the variable slopes, or curvatures, throughout the elongate length of the wiper blade. The pressure distributing linkage and the backing strip may be considered an elongate resiliently flexible surface conforming support for the squeegee, or blade, having twist imparting means operable to impose a blade normalizing twist to both the inner and outer end portions of the blade so as to maintain the blade substantially normal to the surface being wiped.

Further objects and advantages of the present invention will be apparent from the following description, reference being had to the accompanying drawing wherein a preferred embodiment of the present invention is clearly shown.

Figure 1:
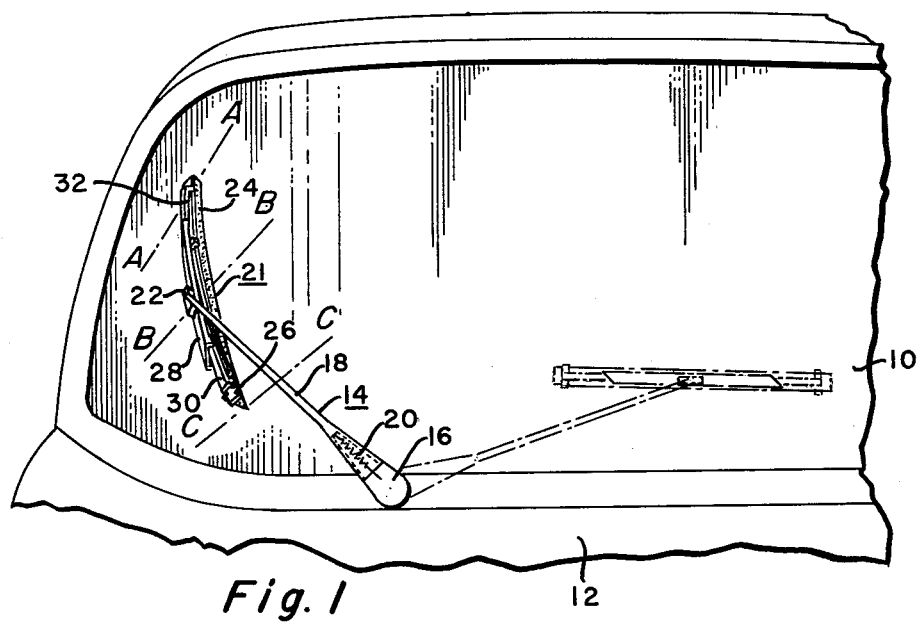
FIGURE 1 is a fragmentary view, in elevation, of a vehicle having a wiper blade of this invention.

With particular reference to FIGURE 1, a portion of a vehicle is shown including wrap-around windshield 10 and a cowl 12. FIGURE 1 depicts the left-hand portion of a windshield as viewed from the front of the vehicle, it being understood that in accordance with conventional practice, the vehicle is equipped with a pair of windshield cleaners designed to move asymmetrically in oscillatory paths across the outer surface of the windshield. Each windshield cleaner comprises an arm 14 having pivotally interconnected inner and outer sections 16 and 18, respectively. The inner arm section 16 is designed for connection to a wiper transmission shaft for imparting oscillation to the arm 14 throughout a predetermined stroke. In addition, the inner and outer arm sections 16 and 18 are interconnected by resilient means 20 which urge the outer section 18 towards the surface of the windshield 10 for applying wiping pressure to a wiper blade 21 which is detachably connected to the outer arm section 18.

Figure 2:
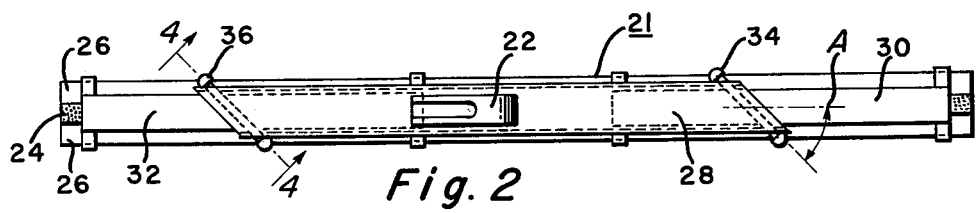
FIGURE 2 is a plan view, in elevation, of a wiper blade constructed according to this invention.

The detachable connection between the outer arm section of the wiper blade may be of any conventional design and constitutes no part of this invention. Thus, as shown in FIGURES 1 and 2, the wiper blade 21 includes a clip 22 to which the outer end of the arm can be detachably connected. As alluded hereinbefore, the wiper blade is moved throughout a predetermined oscillatory stroke from the dotted line position shown in FIGURE 1 to the full line position shown in FIGURE 1 which limit positions constitute the inboard and outboard stroke limits respectively. As it is well recognized that the wrap-around windshield is severely curved adjacent the outboard stroke portion of the windshield wiper, it is extremely difficult to maintain the normal attitude of the blade at this point with conventional wiping apparatus.

Thus, with conventional wiping apparatus, the blade layover at the outboard portion of the windshield is extreme and, in some instances, the blade layover is so far that the metal portions of the blade contact the windshield with resultant scratching of the windshield surface. In addition, this excessive blade layover imposes an undesirable overload on the wiper motor and results in ineffective windshield cleaning.

Figure 3:
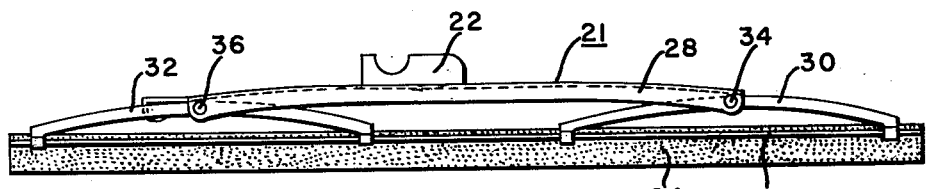
FIGURE 3 is a side view, in elevation, of a wiper blade constructed according to this invention.

With particular reference to FIGURES 2 and 3, the improved blade construction of this assembly eliminates this excessive layover and maintains the blade substantially normal to the windshield throughout the oscillatory stroke and particularly maintains the wiping element of the blade substantially normal to the windshield surface at the severely curved wrap-around windshield portions. The wiper blade comprises an elongate elastomeric wiping element 24 which is carried by a metal backing strip 26. This conventional squeegee assembly is freely flexible in a plane normal to the surface to be wiped, but substantially inflexible in a plane at right angles thereto. In the disclosed embodiment, the pressure distributing linkage comprises a primary yoke, or holder, 28, and a pair of secondary yokes 30 and 32. However, it is to be understood that this particular blade pressure distributing linkage is only exemplary and is not to be construed as a limitation, as the concept of this invention is equally applicable to various other types of flexible blade assemblies now in use. As is conventional, the wiper arm attaching clip 22 is attached to the primary yoke, or holder, 28. In addition, opposite ends of the primary yoke 28 are pivotally connected to intermediate portions of the secondary yokes, the ends of which are movably connected at longitudinally spaced points to the flexible backing strip 26.

However, in the blade distributing linkage of this assembly, instead of having the pivotal connections between the ends of the primary distributing member 28 and the secondary pressure distributing members 30 and 32 at a right angle relative to the longitudinal blade axis, the hinge connections are located at an oblique angle with respect to the longitudinal blade axis. More particularly, the axes of the hinge joints are located at an angle of 45° relative to the longitudinal blade axis. Moreover, the axes of the hinge pins extend downwardly in the direction of the curved surface of the windshield when the wiper blade is adjacent the outboard stroke position as shown in FIGURE 1.

As seen particularly in FIGURES 2 and 3, the connections between the primary distributing member 28 and the secondary pressure distributing members 30 and 32, comprise hinge pins 34 and 36, the axes of which are located at an angle A, which is substantially 45° with respect to the longitudinal axis of the blade. By virtue of this construction, when the secondary pressure distributing members rock relative to the primary pressure distributing member, the rubber wiping element 24 will be maintained substantially normal, or erect, relative to the surface of the windshield being traversed.

Figure 5:
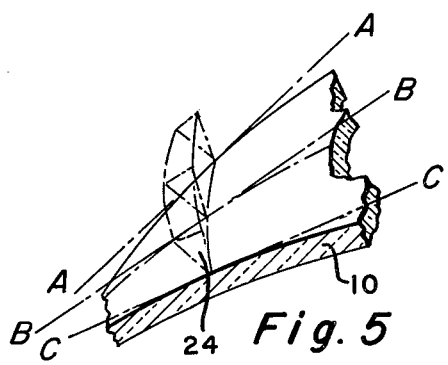
FIGURE 5 is a composite, sectional view taken along lines A—A, B—B and C—C of FIGURE 1, depicting the various slopes, or curvatures, of the glass throughout the length of the wiper blade in the wrap-around portion of the windshield.
Figure 4:
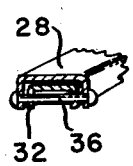
FIGURE 4 is a sectional view taken along line 4—4 of FIGURE 2.

With particular reference to FIGURES 1 and 5, it will be noted that as the wiper arm and blade assembly move from the dotted line position of FIGURE 1 to the full line position of FIGURE 1, the secondary pressure distributing members 30 and 32 will rock about the oblique hinge axes 34 and 36 so as to maintain all sections of the wiping element 24 throughout its length substantially normal to varying slopes, or curvatures, of the windshield in the wrap-around portion. This arrangement keeps the rubber wiping element normal to the glass thereby compensating automatically for the glass twist and resulting in effective cleaning of the severely curved portions of the windshield surface. The oblique hinge joints which are located in a plane substantially normal to the direction of arm applied pressure, operate to twist the wiper blade due to conformance of the wiper blade with the curved surface over which it is moved. Moreover, as seen in FIGURE 4, the connections between the primary and secondary distributing members are of the nesting type, that is, the secondary pressure distributing members are of channeled cross section as is the primary pressure distributing member, and the secondary pressure distributing members are disposed within the primary pressure distributing member.

From the foregoing, it is readily apparent that the present invention provides a unique blade assembly of simple design and construction which is readily adapted to effectively clean the severely curved portions of a wrap-around windshield. Moreover, by virtue of the blade construction of this invention, the entire length of the wiper blade element is maintained substantially normal to the windshield surface.

While the embodiment of the present invention as herein disclosed constitutes a preferred form, it is to be understood that other forms might be adopted.

What is claimed is as follows:

1. A windshield wiper blade for wiping a curved windshield surface having a frontal portion and a wrap-around portion, including, an elongate elastomeric wiping element, a backing strip attached to said wiping element, and a pressure distributing linkage, said pressure distributing linkage comprising a primary pressure distributing member and a plurality of secondary pressure distributing members, the ends of the secondary pressure distributing members being movably connected to said backing strip at longitudinally spaced points, the ends of said primary pressure distributing member being pivotally connected to said secondary pressure distributing members, the axes of the pivot joints lying in a plane parallel to the major plane of the frontal portion of the windshield surface and being oblique to the longitudinal axis of the blade.

2. A flexible wiper blade assembly for wiping a curved windshield surface having a frontal portion and a wrap-around portion, including, a flexible squeegee unit, and pressure distributing means for applying wiping pressure to said squeegee unit at a plurality of longitudinally spaced points, said pressure distributing means comprising a pair of secondary yokes and a primary yoke, the ends of the primary yoke being connected by hinge means to the intermediate portions of the secondary yokes, the axes of the hinge means lying in a plane parallel to the major plane of the frontal portion of the windshield surface and being located at an oblique angle relative to the longitudinal blade axis.

3. A wiper blade assembly for wiping a curved windshield surface having a frontal portion and a wrap-around portion, comprising, an elongate resilient wiping element, a flexible backing strip attached to and carrying said wiping element, and pressure distributing means for applying wiping pressure to said backing strip and wiping element comprising a pair of secondary yokes having their opposite ends connected to said backing strip at longitudinally spaced points, and a primary yoke having its ends pivotally connected to the intermediate portions of said secondary yokes, the axes of said pivotal connections lying in a plane parallel to the major plane of the frontal portion of the windshield surface and being located at an oblique angle relative to the longitudinal axis of the blade.

4. A windshield wiper blade for wiping a curved windshield surface having a frontal portion and a wrap-around portion, comprising a flexible squeegee unit adapted to conform to the surface to be wiped, and a pressure distributing linkage comprising a holder adapted to receive pressure from a single source and distribute said pressure to said squeegee unit at a plurality of longitudinally spaced points, said holder being pivotally connected with a plurality of secondary pressure distributing members which are connected to said squeegee unit at said plurality of longitudinally spaced points, the pivotal connection between the holder and secondary pressure distributing members comprising hinge means, the axes of said hinge means lying in a plane parallel to the major plane of the frontal portion of the windshield and being located at an oblique angle relative to the longitudinal axis of the blade.

5. Windshield cleaning apparatus for a curved windshield surface having a frontal portion and a wrap-around portion, comprising an arm having pressure applying means urging its outer end towards an associated windshield, means for imparting oscillation to said arm throughout a predetermined oscillatory stroke, a wiper blade connected to the outer end of said arm, said wiper blade comprising a flexible squeegee unit and a pressure distributing linkage, said pressure distributing linkage comprising primary and secondary pressure distributing members having hinged connections, the axes of the hinged connections being inclined to the axis of the blade, said axes being located in a plane parallel to the major plane of the frontal portion of the windshield so that when the arm is in a vertical position relative to the windshield said axes will be inclined upwardly towards the center of the windshield.

6. A windshield wiper blade for wiping a curved surface, including, a flexible squeegee unit adapted to conform to the surface to be wiped, a pressure distributing linkage comprising a holder adapted to receive pressure from a single source and distribute said pressure to said squeegee unit at longitudinally spaced points, said holder being pivotally connected with at least two secondary pressure distributing members, said pivotal connection between the holder and the secondary pressure distributing members comprising hinge means, the axes of said hinge means lying in a plane substantially normal to the direction of pressure applied to said holder from said single source and being located at an oblique angle relative to the longitudinal axis of the blade.

7. Windshield cleaning apparatus including, a wiper arm having spring hinge connected inner and outer sections, and a wiper blade connected to the outer section of said wiper arm and maintained under pressure in engagement with the windshield surface to be wiped by said wiper arm, said wiper blade including a flexible squeegee unit and a pressure distributing linkage, said pressure distributing linkage including a primary pressure distributing member and a plurality of secondary pressure distributing members, and hinge means pivotally interconnecting the primary and secondary pressure distributing members, the axes of said hinge means lying in a plane substantially normal to the direction of pressure applied to said blade by said arm and being located at an oblique angle relative to the longitudinal axis of the blade.

8. A wiper blade assembly including, a flexible squeegee unit adapted to conform to the surface to be wiped, and a pressure distributing linkage for applying wiping pressure to said squeegee unit, said pressure distributing linkage comprising a primary pressure distributing member and at least two secondary pressure distributing members, and hinge means pivotally interconnecting the primary and secondary pressure distributing members, the axes of the hinge means lying in a plane normal to the direction of pressure applied to said squeegee unit by said pressure distributing linkage and being located at an oblique angle relative to the longitudinal axis of the blade.

9. A wiper for curved windshields including, a flexible, resilient, elongated wiping element, and an elongated resiliently flexible surface conforming support for the wiping element extending longitudinally thereof and having an arm-attaching part, said support including twist imparting means operable to impart a normalizing twist to the inner and outer end portions of the wiping elements to maintain the wiping element substantially normal to the surface to be wiped.

No references cited.